(12) United States Patent
Luo et al.

(10) Patent No.: US 11,210,091 B2
(45) Date of Patent: Dec. 28, 2021

(54) METHOD AND APPARATUS FOR PROCESSING DATA SPLICING INSTRUCTION

(71) Applicant: Alibaba Group Holding Limited, Grand Cafyman (KY)

(72) Inventors: Jiahui Luo, Hangzhou (CN); Zhijian Chen, Hangzhou (CN); Yubo Guo, Hangzhou (CN); Wenmeng Zhang, Hangzhou (CN); Zhesheng Luo, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/845,499

(22) Filed: Apr. 10, 2020

(65) Prior Publication Data

US 2020/0364048 A1   Nov. 19, 2020

(30) Foreign Application Priority Data

Apr. 12, 2019   (CN) .......................... 201910292629.0

(51) Int. Cl.
*G06F 9/30* (2018.01)
(52) U.S. Cl.
CPC ........ *G06F 9/30036* (2013.01); *G06F 9/3013* (2013.01); *G06F 9/30145* (2013.01)

(58) Field of Classification Search
CPC .................. G06F 9/30036; G06F 9/30145
See application file for complete search history.

(56) References Cited

U.S. PATENT DOCUMENTS

2015/0143086 A1   5/2015   Khan
2018/0210733 A1*  7/2018   Stephens ............ G06F 9/30036

* cited by examiner

*Primary Examiner* — Zachary K Huson

(57) ABSTRACT

The present disclosure discloses an instruction processing apparatus, comprising a first vector register adapted to store a first vector to be operated on, a second vector register adapted to store a second vector to be operated on, a decoder adapted to receive and decode a data splicing instruction, and an execution unit. The data splicing instruction indicates the first vector register as a first operand, the second vector register as a second operand, a splicing indicator, and a destination. The execution unit is coupled to the first vector register, the second vector register, and the decoder, and is adapted to execute the decoded data splicing instruction, so as to acquire a first part of the first vector from the first vector register and acquire a second part of the second vector from the second vector register according to the splicing indicator, splice the acquired first part of the first vector and the acquired second part of the second vector to form a third vector, and store the third vector into the destination.

20 Claims, 10 Drawing Sheets

METHOD AND APPARATUS FOR PROCESSING DATA SPLICING INSTRUCTION

CROSS-REFERENCE TO RELATED APPLICATIONS

This application claims priority to Chinese Patent Application No. 201910292629.0 filed Apr. 12, 2019, which is incorporated herein in its entirety.

TECHNICAL FIELD

The present invention relates to the field of processors, and in particular, to a processor core and a processor having an instruction set of data splicing instructions.

BACKGROUND

SIMD instructions have emerged following the development of processor technology. The SIMD instructions refer to instructions that have a single instruction multiple data structure. Typically, a single instruction performs processing such as addition, subtraction, multiplication, and division on single data, whereas a SIMD instruction can perform the same operation on a plurality of sets of data in parallel. SIMD instructions are suitable for processing vector data because of their characteristics, and are, for example, widely applied in VDSP instructions in vector digital signal processing instruction sets, whereas a VDSP instruction set is suitable for data processing in special complex tasks, such as audio signals, image signals, and artificial intelligence, and is thus an indispensable part in modern high-end digital signal fields.

Matrix operations occur frequently in vector digital signal processing. Data is often misaligned in matrix operations, and in order to maximize the use of address space, elements of vector data are often arranged closely at addresses with no space left. This also causes the vector data to not be aligned by address, hence when data at the addresses is loaded into a vector register via a VDSP read instruction, the elements of the vector data are not aligned in arrangement.

Moreover, even if the elements of the vector data can be aligned at memory addresses, since the total size of the vector data is not in a multiple relationship with the bit width of the vector register, when a user loads the vector data into the vector register, it is inevitable that data last loaded into the vector register cannot completely fill the whole register. Consequently, some invalid information remains in the vector register. If improperly used, the invalid information may be used incorrectly.

Accordingly, a need exists for a solution to efficiently solve the problem of misalignment of vector data, so as to lay the foundation for subsequent efficient implementation of various digital signal processing.

SUMMARY

To this end, the present invention provides a novel instruction processing apparatus and instruction processing method in an attempt to solve or at least alleviate at least one of the problems described above.

According to one aspect of the present invention, an instruction processing apparatus is provided, comprising a first vector register adapted to store a first vector to be operated on, a second vector register adapted to store a second vector to be operated on, a decoder adapted to receive and decode a data splicing instruction, and an execution unit. The data splicing instruction indicates the first vector register as a first operand, the second vector register as a second operand, a splicing indicator, and a destination. The execution unit is coupled to the first vector register, the second vector register, and the decoder, and is adapted to execute the decoded data splicing instruction, so as to acquire a first part of the first vector from the first vector register and acquire a second part of the second vector from the second vector register according to the splicing indicator, splice the acquired first part of the first vector and the acquired second part of the second vector to form a third vector, and store the third vector into the destination.

Optionally, in the instruction processing apparatus according to the present invention, the splicing indicator comprises a length indicator to indicate the length of the first part of the first vector.

Optionally, in the instruction processing apparatus according to the present invention, the first, second, and third vectors have the same length, and the sum of the length of the first part of the first vector and the length of the second part of the second vector is equal to the length of the third vector.

Optionally, in the instruction processing apparatus according to the present invention, the splicing indicator comprises: a first position indicator, for indicating whether the first part of the first vector is acquired starting from a highest-order bit or a lowest-order bit; and a second position indicator, for indicating whether the second part of the second vector is acquired starting from a highest-order bit or a lowest-order bit.

Optionally, the instruction processing apparatus according to the present invention further comprises a third vector register, adapted to serve as the destination to store the third vector.

According to another aspect of the present invention, an instruction processing apparatus is provided, comprising a first vector register adapted to store a first vector to be operated on, a second vector register adapted to store a second vector to be operated on, a general-purpose register adapted to store a splicing indicator, a decoder adapted to receive and decode a data splicing instruction, and an execution unit. The data splicing instruction indicates the first vector register as a first operand, the second vector register as a second operand, the general-purpose register as a third operand, and a destination. The execution unit is coupled to the first vector register, the second vector register, the general-purpose register, and the decoder, and is adapted to execute the decoded data splicing instruction, so as to acquire a first part of the first vector from the first vector register and acquire a second part of the second vector from the second vector register according to the splicing indicator stored in the general-purpose register, splice the acquired first part of the first vector and the acquired second part of the second vector to form a third vector, and store the third vector into the destination.

Optionally, in the instruction processing apparatus according to the present invention, the splicing indicator comprises a length indicator to indicate the length of the first part of the first vector.

Optionally, in the instruction processing apparatus according to the present invention, the first, second, and third vectors have the same length, and the sum of the length of the first part of the first vector and the length of the second part of the second vector is equal to the length of the third vector.

Optionally, in the instruction processing apparatus according to the present invention, the splicing indicator comprises a first position indicator, for indicating whether the first part of the first vector is acquired starting from a highest-order bit or a lowest-order bit; and a second position indicator, for indicating whether the second part of the second vector is acquired starting from a highest-order bit or a lowest-order bit.

Optionally, the instruction processing apparatus according to the present invention further comprises a third vector register, adapted to serve as the destination to store the third vector.

According to a further aspect of the present invention, an instruction processing method is provided, comprising the steps of: receiving and decoding a data splicing instruction, the data splicing instruction indicating a first vector register storing therein a first vector as a first operand, a second vector register storing therein a second vector as a second operand, a splicing indicator, and a destination; and executing the decoded data splicing instruction, so as to acquire a first part of the first vector from the first vector register and acquire a second part of the second vector from the second vector register according to the splicing indicator, splice the acquired first part of the first vector and the acquired second part of the second vector to form a third vector, and store the third vector into the destination.

According to still another aspect of the present invention, a computing system is provided, comprising a memory and a processor coupled to the memory. The processor comprises a vector register set, a decoder, and an execution unit. The vector register set comprises a first vector register adapted to store a first vector and a second vector register adapted to store a second vector; the decoder is adapted to receive and decode a data splicing instruction from the memory. The data splicing instruction indicates the first vector register as a first operand, the second vector register as a second operand, a splicing indicator, and a destination. The execution unit is coupled to the first and second vector registers and the decoder, and is adapted to execute the decoded data splicing instruction, so as to acquire a first part of the first vector from the first vector register and acquire a second part of the second vector from the second vector register according to the splicing indicator, splice the acquired first part of the first vector and the acquired second part of the second vector to form a third vector, and store the third vector into the destination.

According to a further aspect of the present invention, a machine-readable storage medium is provided. The machine-readable storage medium comprises code. The code, when executed, causes a machine to perform the instruction processing method according to the present invention.

According to another aspect of the present invention, a system-on-chip is provided, comprising the instruction processing apparatus or computing system according to the present invention.

According to the solutions of the present invention, lengths and positions of parts to be respectively acquired from a first vector and a second vector are specified using a splicing indicator. This provides users with great flexibility to use data splicing instructions, so that the users can use the instructions freely in different scenarios according to their own needs, thereby significantly improving the applicability of the instructions and more efficient utilization the coding space.

Besides, according to the solutions of the present invention, a first position indicator and a second position indicator may be respectively specified, so as to respectively acquire data from high positions or low positions of two source vector registers for splicing to adapt to different arrangements of data in a memory, thereby increasing the flexibility of the instructions.

Further, according to the solutions of the present invention, a splicing indicator may be acquired from a general-purpose register, so that the value of the splicing indicator does not need to be set at an initial design stage of a program flow, but can be determined freely during running of a program by using various methods, thereby achieving significantly enhanced versatility.

BRIEF DESCRIPTION OF THE DRAWINGS

In order to accomplish the foregoing and related objectives, some illustrative aspects are described herein with reference to the following description and drawings. These aspects indicate various ways in which the principles disclosed herein can be practiced, and all aspects and equivalents thereof are intended to fall within the scope of the claimed subject matter. The foregoing and other objectives, features, and advantages of the present disclosure will become more apparent by reading the following detailed description in conjunction with the accompanying drawings. Throughout the present disclosure, the same reference numerals generally refer to the same components or elements.

DETAILED DESCRIPTION

Exemplary embodiments of the present disclosure will be described below in more detail with reference to the accompanying drawings. Although the accompanying drawings show exemplary embodiments of the present disclosure, it should be understood that the present disclosure may be implemented in various forms and should not be limited by the embodiments described herein. Instead, these embodiments are provided so that the present disclosure can be better understood, and the scope of the present disclosure can be fully conveyed to those skilled in the art.

Figure 1:
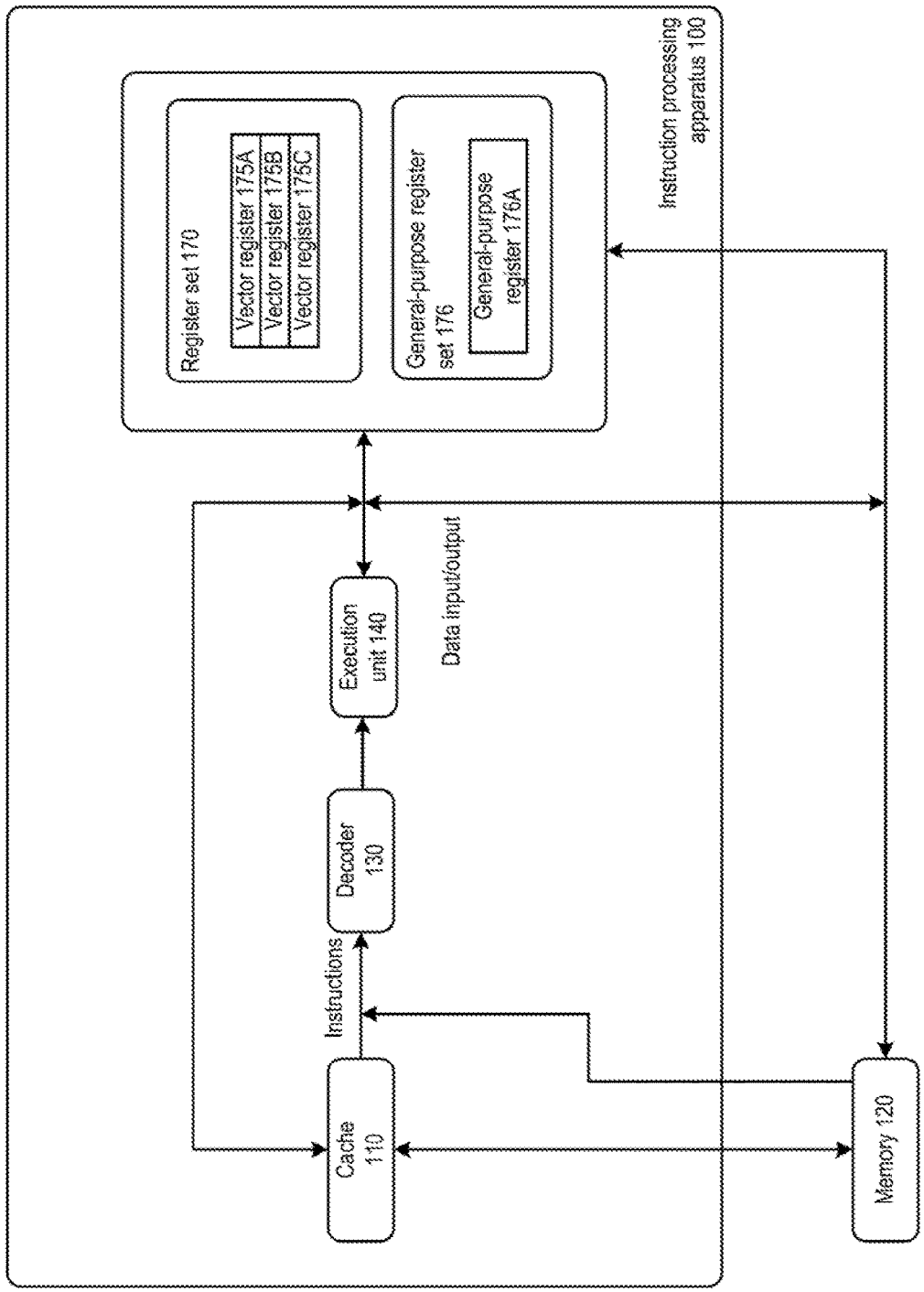
FIG. 1 is a schematic diagram of an instruction processing apparatus according to one embodiment of the present invention.

FIG. 1 is a schematic diagram of an instruction processing apparatus 100 according to one embodiment of the present invention. The instruction processing apparatus 100 has an execution unit 140. The execution unit includes a circuit operable to execute instructions (including a data splicing instruction according to the present invention). In some embodiments, the instruction processing apparatus 100 may be a processor, a processor core of a multi-core processor, or a processing element in an electronic system.

A decoder 130 receives incoming instructions in the form of higher-level machine instructions or macroinstructions, and decodes these instructions to generate lower-level microoperations, microcode entry points, microinstructions, or other lower-level instructions or control signals. The lower-level instructions or control signals may implement operations of the higher-level instructions through lower-level (for example, circuit-level or hardware-level) operations. The decoder 130 may be implemented using various different mechanisms. Examples of suitable mechanisms include, but are not limited to, microcode, lookup tables, hardware implementations, and programmable logic arrays (PLAs). The present invention is not limited to various mechanisms for implementing the decoder 130, and any mechanism capable of implementing the decoder 130 falls within the protection scope of the present invention.

The decoder 130 may receive incoming instructions from a cache 110, a memory 120, or other sources. The decoded instructions include one or a plurality of microoperations, microcode entry points, microinstructions, other instructions, or other control signals, which reflect the received instructions or are derived therefrom. These decoded instructions are sent to the execution unit 140 and executed by the execution unit 140. When executing these instructions, the execution unit 140 receives data input from a register set 170, the cache 110 and/or the memory 120, and generates data output to them.

In one embodiment, the register set 170 includes architectural registers that are also referred to as registers. Unless otherwise specified or clearly apparent, the phrases architectural registers, register set, and registers are used herein to represent registers that are visible to software and/or programmers (for example, software-visible) and/or registers that are specified by macroinstructions to identify operands. These registers are different from other non-architectural registers (for example, temporary registers, reorder buffers, or retirement registers) in a given microarchitecture.

To avoid obscuring the description, a relatively simple instruction processing apparatus 100 has been shown and described. It should be understood that other embodiments may have more than one execution unit. For example, the apparatus 100 may include a plurality of different types of execution units, such as, for example, arithmetic units, arithmetic logic units (ALUs), integer units, and floating point units. Other embodiments of the instruction processing apparatus or processor may have a plurality of cores, logical processors, or execution engines. A plurality of embodiments of the instruction processing apparatus 100 will be provided later with reference to FIGS. 6A to 13.

According to one embodiment, the register set 170 includes a set of vector registers 175. The vector register set 175 can include a first vector register 175A and a second vector register 175B. The two vector registers 175A and 175B respectively store operands of a data splicing instruction. Each of the vector registers 175 may be 512-bit, 256-bit, or 128-bit wide, or the vector registers 175 may use different vector widths. Optionally, the register set 170 may further include a set of general-purpose registers 176. The general-purpose register set 176 can include a general-purpose register 176A. The general-purpose register 176A may also store a source operand of the data splicing instruction. According to another embodiment, the vector registers 175 further include a third vector register 175C for storing a processing result of the data splicing instruction.

Figure 2:
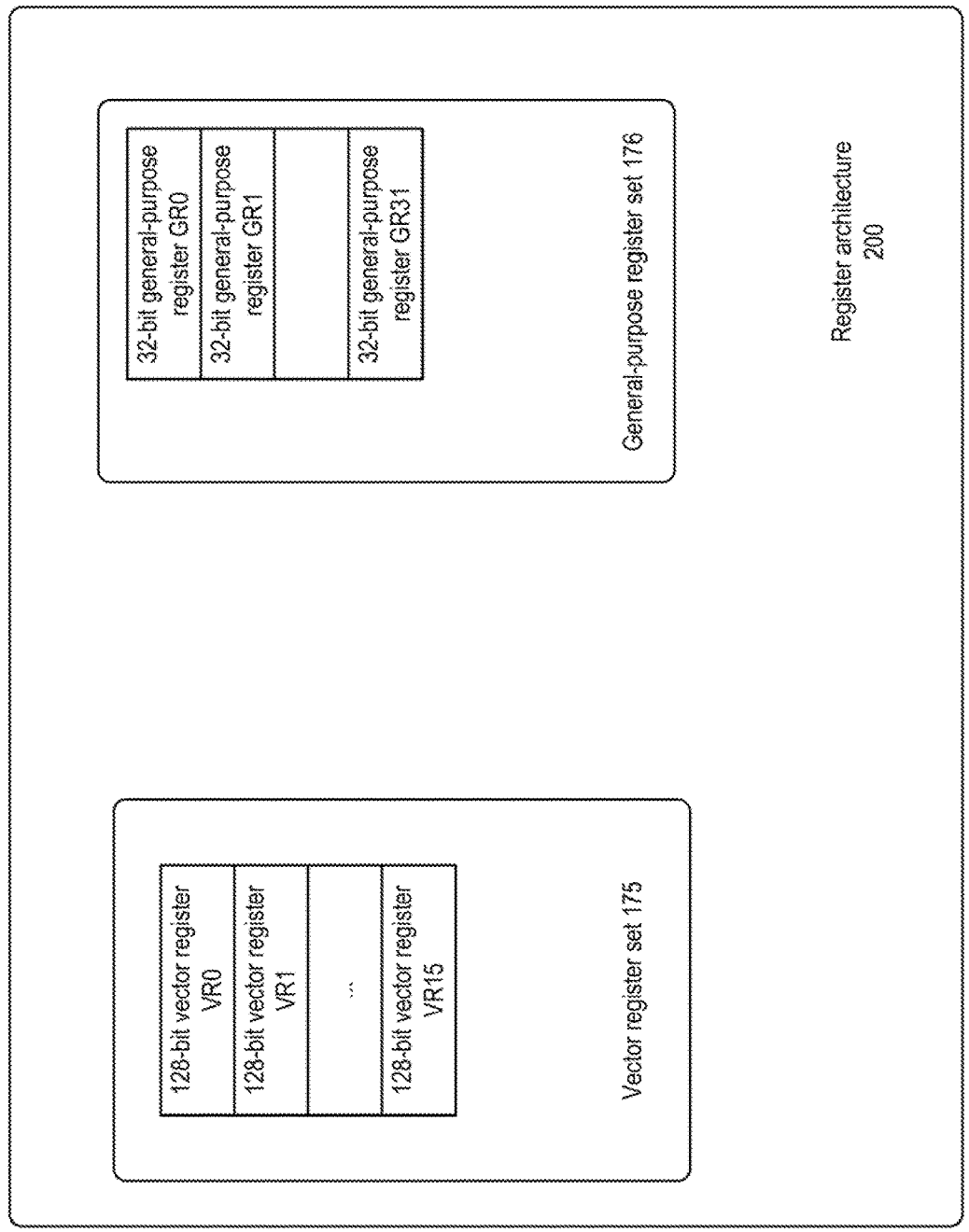
FIG. 2 is a schematic diagram of a register architecture according to one embodiment of the present invention.

FIG. 2 is a schematic diagram of an underlying register architecture 200 according to one embodiment of the present invention. The register architecture 200 is based on a C-SKY processor that implements a vector signal processing instruction set. However, it should be understood that different register architectures that support different register lengths, different register types and/or different numbers of registers can also be used without going beyond the protection scope of the present invention.

As shown in FIG. 2, sixteen 128-bit vector registers VR0[127:0] to VR15[127:0] and a series of data processing SIMD instructions executed for these sixteen vector registers are defined in the register architecture 200. Depending on the definition of a specific instruction, each vector register may be regarded as a number of 8-bit, 16-bit, 32-bit, or even 64-bit elements. In addition, thirty-two 32-bit general-purpose registers GR0[31:0] to GR31[31:0] are also defined in the register architecture 200. The general-purpose registers GR0 to GR31 may store some control status values during processing of the SIMD instructions. According to one implementation, a set of vector registers 175 described with reference to FIG. 1 may employ one or a plurality of the vector registers VR0 to VR15 shown in FIG. 2 and the general-purpose registers 176 described with reference to FIG. 1 may likewise employ any of the general-purpose registers GR0 to GR31 shown in FIG. 2.

Alternative embodiments of the present invention may use wider or narrower registers. Additionally, alternative embodiments of the present invention may use more, less, or different register sets and registers.

Figure 3:
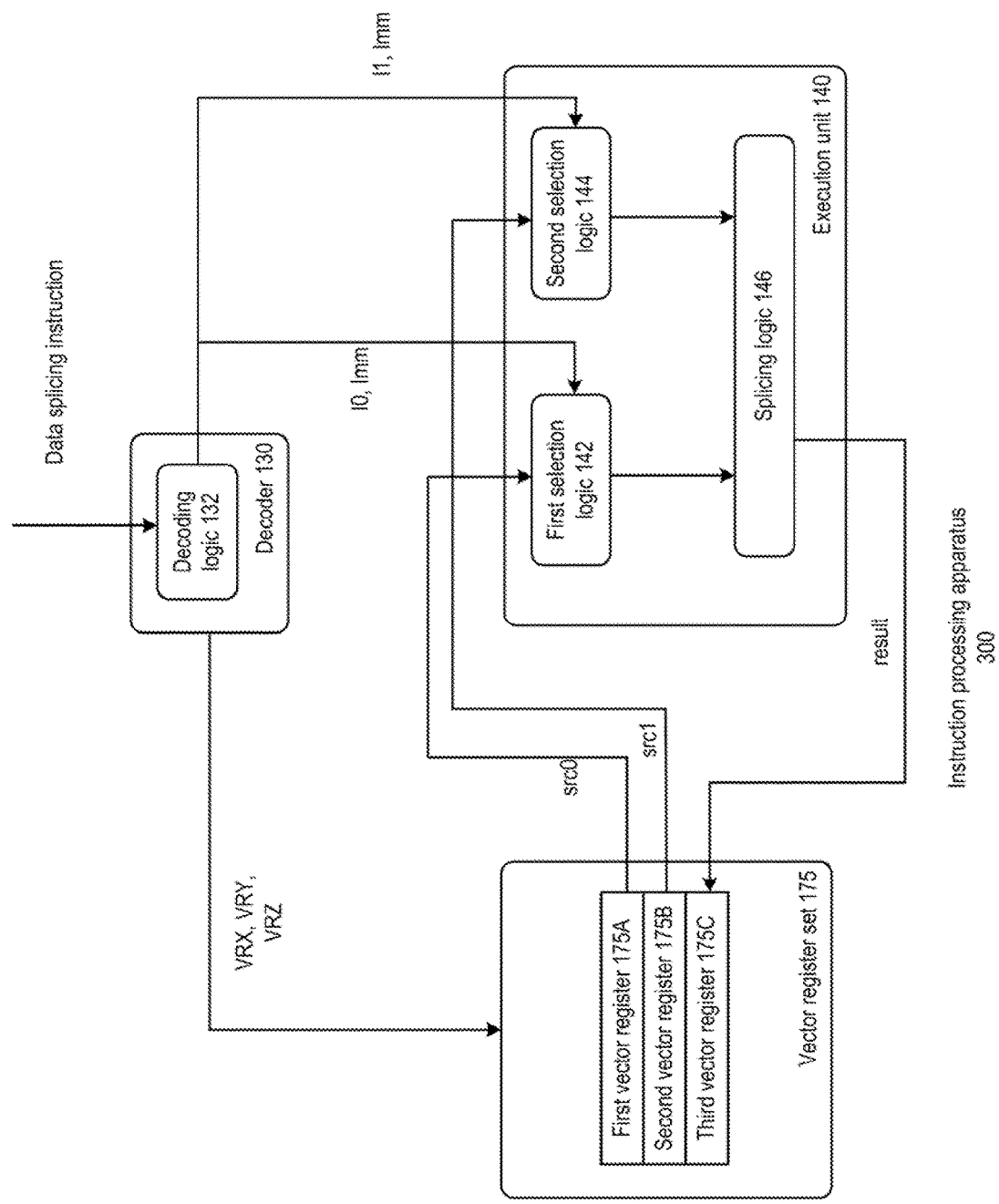
FIG. 3 is a schematic diagram of an instruction processing apparatus according to one embodiment of the present invention.

FIG. 3 is a schematic diagram of an instruction processing apparatus 300 according to one embodiment of the present invention. The instruction processing apparatus 300 shown in FIG. 3 is a further extension of the instruction processing apparatus 10 shown in FIG. 1, and some components are omitted for ease of description. Thus, the same numerals as those in FIG. 1 are used to indicate the same and/or similar components.

The instruction processing apparatus 3M) is suitable for executing a data splicing instruction VEXTI. According to one implementation of the present invention, the data splicing instruction VEXTI has the following format:

VEXI VRX, VRY, VRZ, opt where VRX specifies a first vector register used as a first operand, VRY specifies a second vector register used as a second operand, VRZ specifies a destination used for storing an instruction processing result, and opt is an immediate operand specifying a splicing indicator.

As shown in FIG. 3, the decoder 130 includes decoding logic 132. The decoding logic 132 decodes the data splicing instruction VEXTI to determine the first vector register corresponding to VRX and the second vector register corresponding to VRY in the vector register set 175, the destination corresponding to VRZ, and the value of the immediate operand opt.

Optionally, according to one implementation of the present invention, the destination is a third vector register in the vector register set 175; therefore, the decoding logic 132 further determines the third vector register corresponding to VRZ.

The execution unit 140 includes first selection logic 142, second selection logic 144, and splicing logic 146. The first selection logic 142 reads a first vector src0 stored in the first vector register, and selects a part of src0 according to the value of opt to send the selected part to the splicing logic 146. The second selection logic 144 reads a second vector src1 stored in the second vector register, and selects a part of src1 according to the value of opt to send the selected part to the splicing logic 146. The splicing logic 146 receives the part of the first vector src0 selected by the first selection logic 142 and the part of the second vector src1 selected by the second selection logic 144, splices them to generate a third vector result, and writes the third vector into the destination. According to one implementation of the present invention, when the destination is the third vector register, the splicing logic 146 writes the third vector result into the third vector register.

Optionally, according to one embodiment of the present invention, the splicing indicator opt includes a length indicator 1 mm, the first selection logic 142 selects, according to the value of Imm, a part of the first vector src0 having a length corresponding to Imm, and the second selection logic 144 selects, from the second vector src1 according to the value of Imm, another part having a remaining length required for splicing into the third vector result.

According to another embodiment of the present invention, the first vector src0, the second vector src1, and the third vector result have the same length. Thus, the length of the part of the second vector src1 selected by the second selection logic 144 may also be obtained according to the length indicator Imm, and the sum of the length of the part of the first vector src0 selected by the first selection logic 142 and the length of the part of the second vector src1 selected by the second selection logic 144 is equal to the length of the third vector result.

According to a further embodiment of the present invention, the splicing indicator opt includes a position indicator I0 for the first vector src0 and a position indicator I1 for the second vector src1. The first selection logic 142 determines, according to the value of the position indicator I0, whether the part of the first vector src0 is selected starting from a highest-order bit or a lowest-order bit, and the second selection logic 144 determines, according to the value of the position indicator I1, whether the part of the second vector src1 is selected starting from a highest-order bit or a lowest-order bit.

According to one embodiment, in the case that the instruction processing apparatus 300 uses the underlying register architecture 200 shown in FIG. 2, the first vector src0 and the second vector src1 are respectively stored in one of the 128-bit vector registers VR0 to VR15 and are 128-bit vectors. In this case, in the splicing indicator opt, Imm is of 4-bit length Imm4, and the position indicators I1 and I0 are respectively of 1-bit length.

The first selection logic 142 selects, according to the values of I0 and Imm4, a part of elements T0 from the first vector src0 stored in the vector register 175A:

when I0=0: acquire an element having a size of (Imm4+1) bytes starting from a low-order bit of the vector register 175A;

when I0:=1: acquire an element having a size of (Imm4+1) bytes starting from a high-order bit of the vector register 175B.

Finally, the part of elements T0 are obtained.

The second selection logic 144 selects, according to the values of I1 and Imm4, a part of elements T1 from the second vector src1 stored in the vector register 175B:

when I1=0: acquire an element having a size of (15−Imm4) bytes starting from a low-order bit of the vector register 175B;

when I1=1: acquire an element having a size of (15−Imm4) bytes starting from a high-order bit of the vector register 175B.

Finally, the part of elements T1 are obtained.

After the parts of elements T1 and T0 are separately obtained, the splicing logic 146 splices them into new 128-bit {T1, T0} vector data result and stores it into the destination vector register 175C indicated by VRZ.

According to the instruction processing apparatus 300 shown in FIG. 3, a splicing indicator opt is introduced to provide many different choices for vector splicing, so that a user can splice vectors in vector registers flexibly using a data splicing instruction VEXTI according to usage scenarios.

Figure 4:
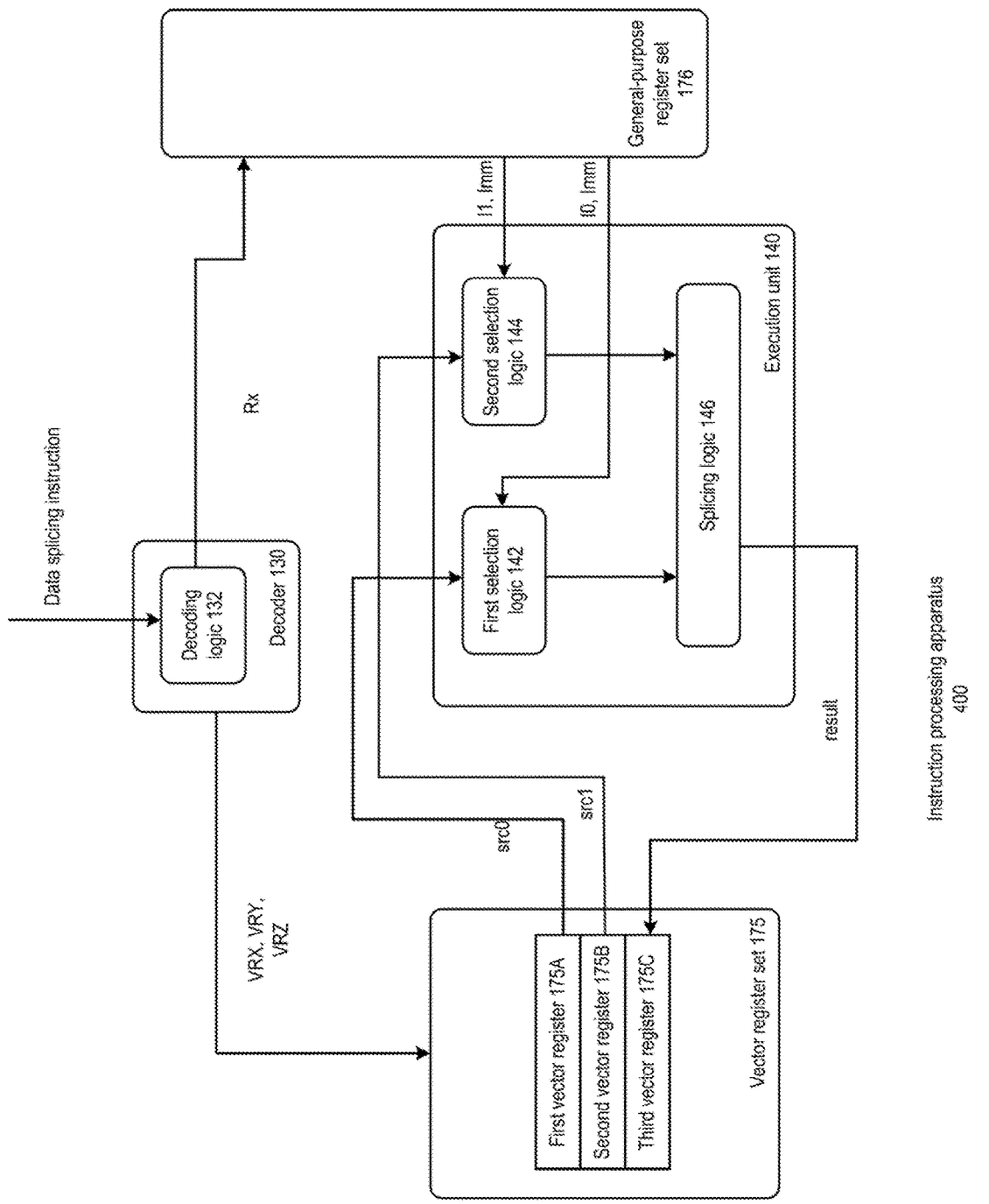
FIG. 4 is a schematic diagram of an instruction processing apparatus according to another embodiment of the present invention.

FIG. 4 is a schematic diagram of an instruction processing apparatus 400 according to another embodiment of the present invention. The instruction processing apparatus 400 shown in FIG. 4 is a further extension of the instruction processing apparatuses 100 and 300 shown in FIG. 1 and FIG. 3, and some components are omitted for ease of description. Thus, the same numerals as those in FIG. 1 and FIG. 3 are used to indicate the same and/or similar components.

The instruction processing apparatus is suitable for executing a data splicing instruction VEXT. According to one implementation of the present invention, the data splicing instruction VEXT has the following format:

VEXT VRX, VRY, VRZ, Rk where VRX specifies a first vector register used as a first operand, VRY specifies a second vector register used as a second operand, VRZ specifies a destination used for storing an instruction processing result, and Rk specifies a general-purpose register that stores a splicing indicator opt.

VEXT differs from VEXTI in that VEXT does not directly use the splicing indicator opt as an immediate operand, but specifies a general-purpose register Rk, which stores the splicing indicator opt, as the operand.

In FIG. 4, the decoding logic 132 does not directly determine the value of the immediate operand opt, but determines a general-purpose register 176A corresponding to Rk in the general-purpose register set 176. The first selection logic 142 and the second selection logic 144 do not perform operations directly according to the value of opt, but separately acquire the value of opt from the general-purpose register 176A to select parts of elements T0 and T1 from a first vector src0 and a second vector scr1.

In addition to the above differences, the functions of various components in the instruction processing apparatus 400 shown in FIG. 4 are the same as those of the components in the instruction processing apparatus 300 shown in FIG. 3, and will not be described again herein.

According to one implementation of the present invention, in the case that the instruction processing apparatus 400 uses the underlying register architecture 20 shown in FIG. 2, Rk is a general-purpose register index (where k is a 5-bit binary number and can represent any register of R0 to R31), data of the register Rk is read from a general-purpose register file according to the index, and the low-order 6 bits in Rk represent {I1, I0, Imm4}, that is. Rk[3:0]=Imm4, Rk[4]=I0, Rk[5]=I1.

The advantage of the instruction processing apparatus 400 described with reference to FIG. 4 is that there is no need for the user to set splicing rules in advance; instead, a splicing mode can be designed by a program itself and stored in the general-purpose register Rk during execution of the program, thereby achieving higher flexibility.

Figure 5:
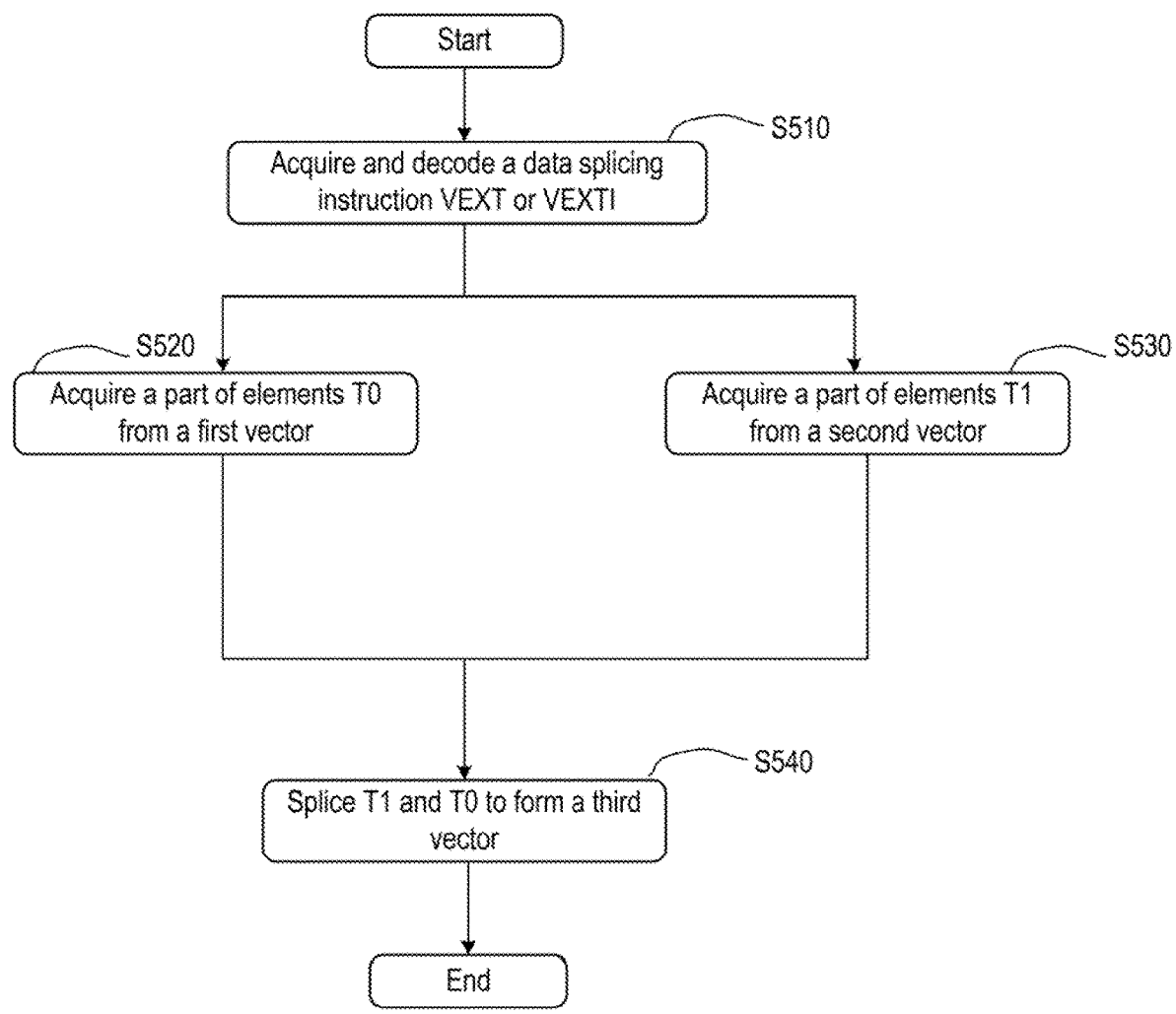
FIG. 5 is a schematic diagram of an instruction processing method according to one embodiment of the present invention.

FIG. 5 is a schematic diagram of an instruction processing method 500 according to a further embodiment of the present invention. The instruction processing method described in FIG. 5 is suitable for execution in the instruction processing apparatus, the processor core, the processor computer system, and the system-on-chip described with reference to FIG. 1, FIG. 3. FIG. 4, and FIG. 6A to FIG. 9, and is suitable for executing the data splicing instructions VEXT and VEXTI described above.

As shown in FIG. 5, the method 500 starts with step S510. In step S510, a data splicing instruction VEXT or VEXTI is received and decoded. As described above with reference to FIG. 3 and FIG. 4, the data splicing instruction VEXTI has the following format:

VEXTI VRX, VRY, VRZ, opt where VRX specifies a first vector register used as a first operand, VRY specifies a second vector register used as a second operand, VRZ specifies a destination used for storing an instruction processing result, and opt is an immediate operand specifying a splicing indicator.

The data splicing instruction VEXT has the following format:

VEXT VRX, VRY, VRZ, Rk where VRX specifies a first vector register used as a first operand, VRY specifies a second vector register used as a second operand, VRZ specifies a destination used for storing an instruction processing result, and Rk specifies a general-purpose register that stores a splicing indicator opt.

Subsequently, in step S520, a first vector src0 stored in the first vector register VRX (the vector register 175A) obtained by decoding in step S510 is processed to select a part of elements T0 therein according to the value of the splicing indicator opt (or the splicing indicator opt stored in the general-purpose register Rx). The processing in step S520 is the same as the processing of the first selection logic 142 described above with reference to FIG. 3 and FIG. 4, and will not be described again herein.

Meanwhile, in step S530, a second vector src1 stored in the second vector register VRY (the vector register 175B) obtained by decoding in step S510 is processed to select a part of elements T1 therein according to the value of the splicing indicator opt (or the splicing indicator opt stored in the general-purpose register Rx). The processing in step S530 is the same as the processing of the second selection logic 144 described above with reference to FIG. 3 and FIG. 4, and will not be described here again.

Subsequently, in step S540, the part of elements T0 selected in step S520 and the part of elements T1 selected in step S530 are spliced to form a third vector result=(T1, T0). The third vector result is stored into the destination. According to one implementation of the present invention, the third vector result may be stored into the vector register 175C corresponding to the third vector register VRZ. The processing in step S540 is the same as the processing of the splicing logic 146 described above with reference to FIG. 3 and FIG. 4, and will not be described here again.

As described above, the instruction processing apparatus according to the present invention may be implemented as a processor core, and the instruction processing method may be performed in the processor core. The processor core may be implemented in different processors in different ways. For example, the processor core may be implemented as a general-purpose in-order core intended for general-purpose computation, a high-performance general-purpose out-of-order core intended for general-purpose computation, and a special-purpose core intended for graphics and/or scientific (throughput) computation. The processor may be implemented as a CPU (central processing unit) and/or a coprocessor, where the CPU may include one or a plurality of general-purpose in-order cores and/or one or a plurality of general-purpose out-of-order cores, and the coprocessor may include one or a plurality of special-purpose cores. Such a combination of different processors may lead to different computer system architectures. In one computer system architecture, a coprocessor is on a chip that is separate from a CPU. In another computer system architecture, a coprocessor is on a separate die in the same package as a CPU. In a further computer system architecture, a coprocessor is on the same die as a CPU (in this case, such a coprocessor is sometimes referred to as special-purpose logic such as integrated graphics and/or scientific (throughput) logic, or as a special-purpose core). In a further computer system architecture referred to as a system-on-chip, the described CPU (sometimes referred to as an application core or application processor), the above described coprocessor and additional functionality may be included on the same die. Exemplary core architectures, processors, and computer architectures will be subsequently described with reference to FIGS. 6A to 9.

Figure 6A:
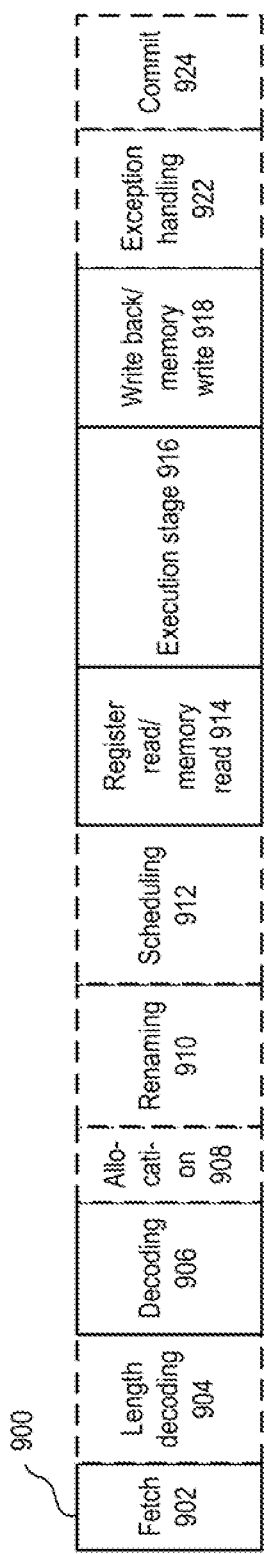
FIG. 6A is a schematic diagram of an instruction processing pipeline according to an embodiment of the present invention.
Figure 6B:
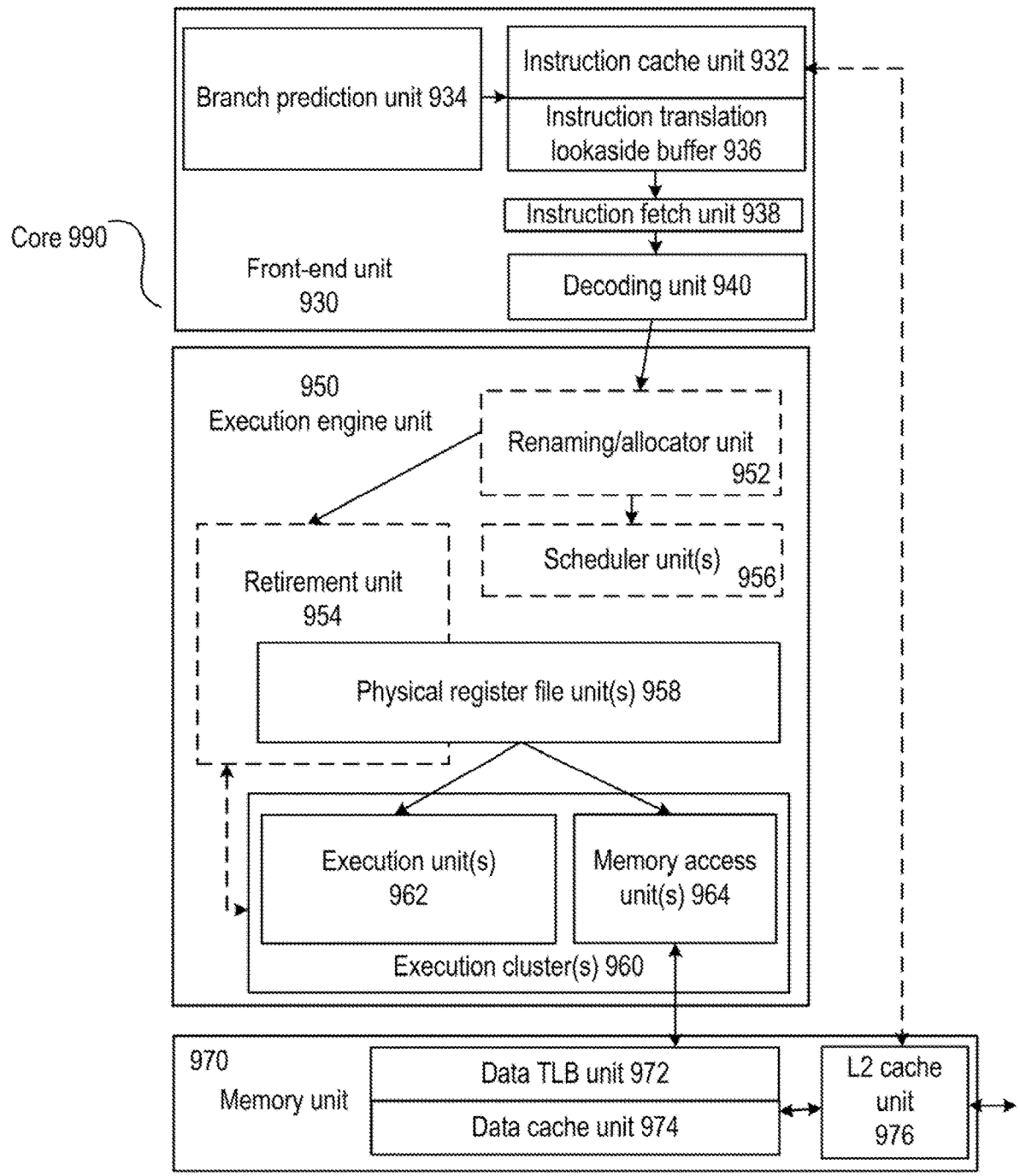
FIG. 6B is a schematic diagram of a processor core architecture according to an embodiment of the present invention.

FIG. 6A is a schematic diagram of an instruction processing pipeline according to an embodiment of the present invention. The pipeline includes an in-order pipeline and an out-of-order issue/execution pipeline. FIG. 6B is a schematic diagram of a processor core architecture according to an embodiment of the present invention, which includes an in-order architecture core and an out-of-order issue/execution architecture core related to register renaming. In FIGS. 6A and 6B, the solid lined boxes illustrate the in-order pipeline and in-order core, while the optional additional items in the dashed lined boxes illustrate the out-of-order issue/execution pipeline and core.

As shown in FIG. 6A, a processor pipeline 900 includes a fetch stage 902, a length decoding stage 904, a decoding stage 906, an allocation stage 908, a renaming stage 910, a scheduling (also referred to as a dispatch or issue) stage 912, a register read/memory read stage 914, an execution stage 916, a write back/memory write stage 918, an exception handling stage 922, and a commit stage 924.

As shown in FIG. 6B, the processor core 990 includes an execution engine unit 950 and a front-end unit 930 coupled to the execution engine unit 950. Both the execution engine unit 950 and the front-end unit 930 are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, a compression engine, a coprocessor core, a general-purpose computing graphics processing unit (GPGPU) core, or a graphics core (GPU).

The front-end unit 930 includes a branch prediction unit 934, an instruction cache unit 932 coupled to the branch prediction unit 934, an instruction translation lookaside buffer (TLB) 936 coupled to the instruction cache unit 932, an instruction fetch unit 938 coupled to the instruction translation lookaside buffer 936, and a decoding unit 940 coupled to the instruction fetch unit 938. The decoding unit (or decoder) 940 may decode instructions, and generate as an output one or a plurality of microoperations, microcode entry points, microinstructions, other instructions, or other control signals, which are decoded from, or which otherwise reflect, or are derived from, the original instructions. The decoding unit 940 may be implemented using various different mechanisms, including, but not limited to, lookup tables, hardware implementations, programmable logic arrays (PLAs), microcode read-only memories (ROMs), and the like. In one embodiment, the core 990 includes a microcode ROM or another medium that stores microcode for some macroinstructions (for example, in the decoding unit 940 or otherwise within the front-end unit 930). The decoding unit 940 is coupled to a renaming/allocator unit 952 in the execution engine unit 950.

The execution engine unit 950 includes the renaming/allocator unit 952. The renaming/allocator unit 952 is coupled to a retirement unit 954 and one or a plurality of scheduler units 956. The scheduler unit 956 represents any number of different schedulers, including reservation stations, central instruction window, and the like. The scheduler unit 956 is coupled to each physical register set unit 958. Each physical register set unit 958 represents one or a plurality of physical register sets. Different physical register sets store one or a plurality of different data types, such as scalar integer, scalar floating point, packed integer, packed floating point, vector integer, vector floating point, and status (for example, an instruction pointer used as the address of the next instruction to be executed). In one embodiment, the physical register set units 958 include a vector register unit, a write mask register unit, and a scalar register unit. These register units may provide architectural vector registers, vector mask registers, and general-purpose registers. The physical register set units 958 are overlapped by the retirement unit 954 to illustrate various ways in which register renaming and out-of-order execution may be implemented (for example, using a reorder buffer and a retirement register set; using a future file, a history buffer, and a retirement register set; or using a register map and a register pool). The retirement unit 954 and the physical register set unit 958 are coupled to an execution cluster 960. The execution cluster 960 includes one or a plurality of execution units 962 and one or a plurality of memory access units 964. The execution units 962 may perform various operations (for example, shifting, addition, subtraction, and multiplication) and perform operation on various types of data (for example, scalar floating point, packed integer, packed floating point, vector integer, and vector floating point). While some embodiments may include a plurality of execution units dedicated to specific functions or sets of functions, other embodiments may include only one execution unit or a plurality of execution units that all execute all functions. In some embodiments, the scheduler units 956, physical register set units 958, and execution clusters 960 are possibly plural because separate pipelines are created for some types of data/operations (for example, scalar integer pipelines, scalar floating point/packed integer/packed floating point/vector integer/vector floating point pipelines, and/or memory access pipelines that respectively have their own scheduler units, physical register set units, and/or execution clusters). It should also be understood that where separate pipelines are used, one or a plurality of these pipelines may be out-of-order issue/execution and the remaining pipelines may be in-order issue/execution.

The memory access unit 964 is coupled to the memory unit 970. The memory unit 970 includes a data TLB unit 972, a data cache unit 974 coupled to the data TLB unit 972, and a level 2 (L2) cache unit 976 coupled to the data cache unit 974. In one exemplary embodiment, the memory access unit 964 may include a loading unit, an address storage unit, and a data storage unit, each of which is coupled to the data LB unit 972 in the memory unit 970. The instruction cache unit 934 may further be coupled to the level 2 (L2) cache unit 976 in the memory unit 970. The L2 cache unit 976 is coupled to one or a plurality of other levels of caches and eventually to a main memory.

By way of example, the core architecture described above with reference to FIG. 6B may implement the pipeline 900 described above with reference to FIG. 6A in the follow way: 1) the instruction fetch unit 938 performs the fetch and length decoding stages 902 and 904; 2) the decoding unit 940 performs the decoding stage 906; 3) the renaming/allocator unit 952 performs the allocation stage 908 and the renaming stage 910; 4) the scheduler unit 956 performs the scheduling stage 912; 5) the physical register set unit 958 and the memory unit 970 perform the register read/memory read stage 914; the execution cluster 960 performs the execution stage 916; 6) the memory unit 970 and the physical register set unit 958 perform the write back/memory write stage 918; 7) various units may be involved in the exception handling stage 922; and 8) the retirement unit 954 and the physical register set unit 958 perform the commit stage 924.

The core 990 may support one or a plurality of instruction sets (for example, the x86 instruction set (with some extensions that have been added with newer versions); the MIPS instruction set of MIPS Technologies, Inc; the ARM instruction set, with optional additional extensions such as NEON, of ARM Holdings), including the instructions described herein. It should be understood that the core may support multithreading (executing a set of two or more parallel operations or threads), and may perform the multithreading in a variety of ways including time sliced multithreading, simultaneous multithreading (where a single physical core provides a logical core for each of threads that the physical core is simultaneously multithreading), or a combination thereof (for example, time sliced fetching and decoding and using hyperthreading technology thereafter to implement simultaneous multithreading).

Figure 7:
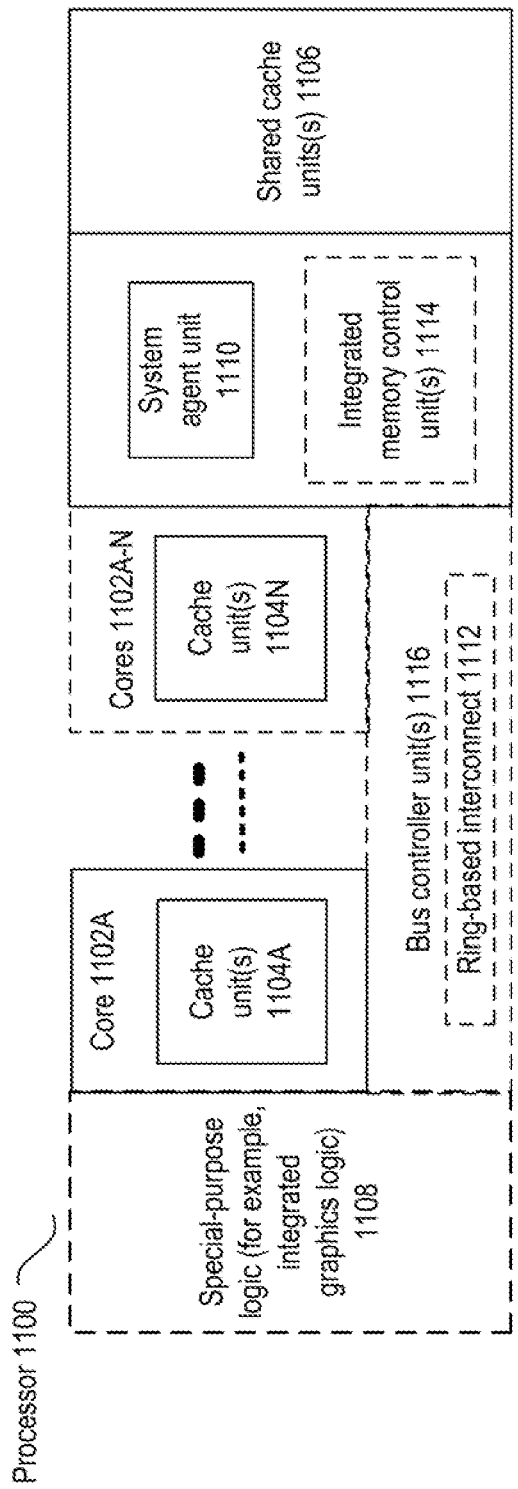
FIG. 7 is a schematic diagram of a processor according to one embodiment of the present invention.

FIG. 7 is a schematic diagram of a processor 1100 according to one embodiment of the present invention. As shown in the solid lined boxes in FIG. 7, according to one implementation, the processor 1100 includes a single core 1102A, a system agent unit 110, and a bus controller unit 1116. As shown in the dashed lined boxes in FIG. 7, according to another implementation of the present invention, the processor 1100 may further include a plurality of cores 1102A-N, an integrated memory controller unit 1114 in the system agent unit 1110, and special-purpose logic 1108.

According to one implementation, the processor 1100 may be implemented as a central processing unit (CPU), where the special-purpose logic 1108 is integrated graphics and/or scientific (throughput) logic (which may include one or a plurality of cores), and the cores 1102A-N are one or a plurality of general-purpose cores (for example, general-purpose in-order cores, general-purpose out-of-order cores, or a combination of the two). According to another implementation, the processor 1100 may be implemented as a coprocessor, where the cores 1102A-N are a plurality of special-purpose cores intended for graphics and/or scientific (throughput). According to a further implementation, the processor 1100 may be implemented as a coprocessor, where the cores 1102A-N are a plurality of general-purpose in-order cores. Thus, the processor 110 may be a general-purpose processor, a coprocessor, or a special-purpose processor, such as, for example, a network or communication processor, a compression engine, a graphics processor, a GPGPU (general-purpose graphics processing unit), a high-throughput many integrated core (MIC) coprocessor (including 30 or more cores), or an embedded processor. The processor 1100 may be implemented on one or a plurality of chips. The processor 1100 may be a part of one or a plurality of substrates and/or may be implemented on one or a plurality of substrates using any of a plurality of process technologies, such as, for example, BiCMOS, CMOS, or NMOS.

The memory hierarchy includes one or a plurality of levels of caches within the cores, one or a plurality of shared cache units 1106, and an external memory (not shown) coupled to the integrated memory controller unit 1114. The shared cache units 1106 may include one or a plurality of mid-level caches, such as level 2 (L2), level 3 (L3), level 4 (L4), or other levels of caches, a last level cache (LLC), and/or combinations thereof. Although in one embodiment, a ring-based interconnect unit 1112 interconnects the integrated graphics logic 1108, the shared cache unit 1106, and the system agent unit 1110/integrated memory controller unit 1114, the present invention is not limited thereto, and any number of well-known techniques may be used for interconnecting such units.

The system agent 1110 includes those components coordinating with and operating the cores 1102A-N. The system agent unit 1110 may include, for example, a power control unit (PCU) and a display unit. The PCU may include logic and components needed for regulating the power state of the cores 1102A-N and the integrated graphics logic 1108. The display unit is used for driving one or a plurality of externally connected displays.

The cores 1102A-N may have the core architecture described above with reference to FIGS. 6A and 6B, and may be homogeneous or heterogeneous in terms of architecture instruction set. That is, two or more of the cores 1102A-N may be capable of executing the same instruction set, while others may be capable of executing only a subset of that instruction set or a different instruction set.

Figure 8:
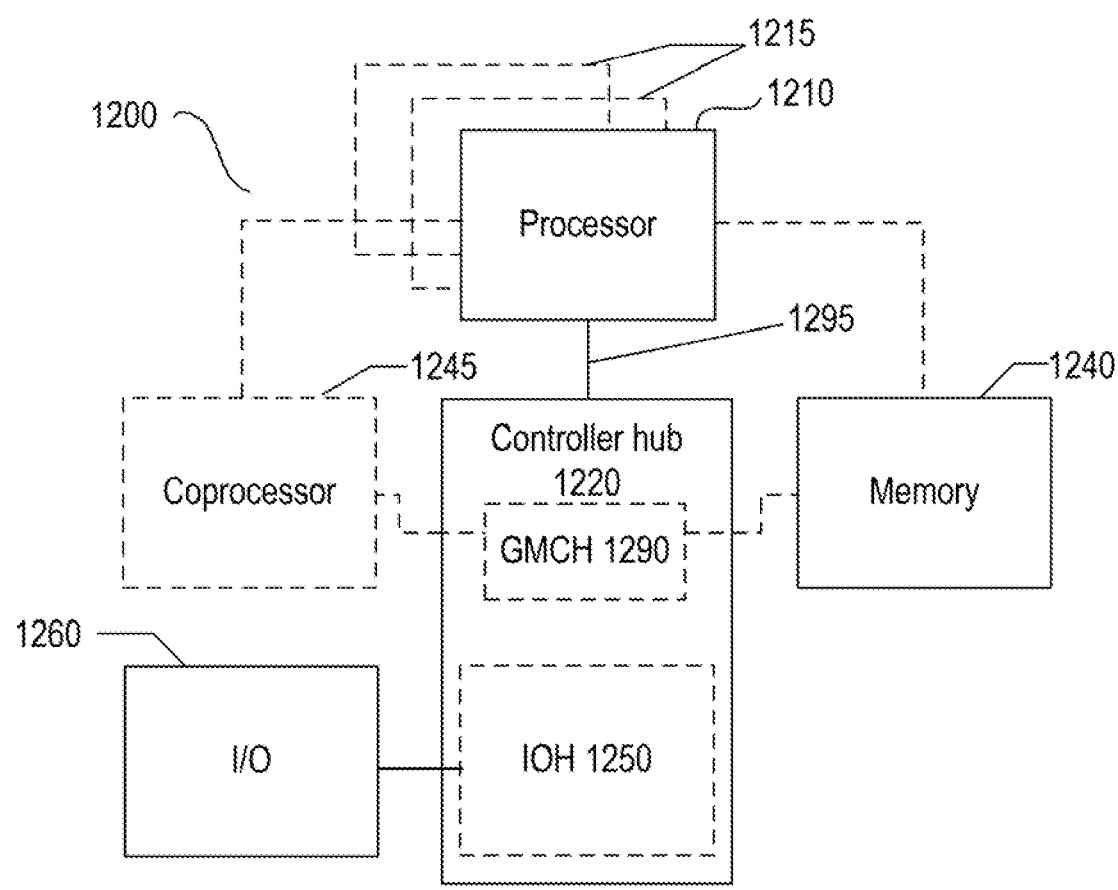
FIG. 8 is a schematic diagram of a computer system according to one embodiment of the present invention.

FIG. 8 is a schematic diagram of a computer system 1200 according to one embodiment of the present invention. The computer system 1200 shown in FIG. 8 may be applied to a laptop device, a desktop computer, a handheld PC, a personal digital assistant, an engineering workstation, a server, a network device, a network hub, a switch, an embedded processor, a digital signal processor (DSP), a graphics device, a video game device, a set-top box, a microcontroller, a cellular phone, a portable media player, a handheld device, and various other electronic devices. The present invention is not limited to this, and all systems capable of incorporating the processor and/or other execution logic disclosed in this specification fall within the protection scope of the present invention.

As shown in FIG. 8, the system 1200 may include one or a plurality of processors 1210, 1215. These processors are coupled to a controller hub 1220. In one embodiment, the controller hub 1220 includes a graphics memory controller hub (GMCH) 1290 and an input/output hub (IOH) 1250 (which may be on separate chips). The GMCH 1290 includes a memory controller and a graphics controller coupled to a memory 1240 and a coprocessor 1245. The IOH 1250 couples an input/output (I/O) device 1260 to the GMCH 1290. Alternatively, the memory controller and the graphics controller are integrated in the processor, so that the memory 1240 and the coprocessor 1245 are coupled directly to the processor 1210, in which case the controller hub 1220 includes only the IOH 1250.

The optional features of the additional processor 1215 is denoted in FIG. 8 with broken lines. Each processor 1210, 1215 may include one or a plurality of the processor cores described herein and may be a specific version of the processor 1100.

The memory 1240 may be, for example, a dynamic random access memory (DRAM), a phase change memory (PCM), or a combination of the two. For at least one embodiment, the controller hub 1220 communicates with the processors 1210, 1215 via a multi-drop bus such as a frontside bus (FSB), a point-to-point interface such as QuickPath Interconnect (QPI), or a similar connection 1295.

In one embodiment, the coprocessor 1245 is a special-purpose processor, such as, for example, a high-throughput MIC processor, a network or communication processor, a compression engine, a graphics processor, a GPGPU, or an embedded processor. In one embodiment, the controller hub 1220 may include an integrated graphics accelerator.

In one embodiment, the processor 1210 executes instructions that control data processing operations of general types. Coprocessor instructions may be embedded in these instructions. The processor 1210 recognizes these coprocessor instructions as being of a type that should be executed by the attached coprocessor 1245. Accordingly, the processor 1210 issues these coprocessor instructions (or control signals representing coprocessor instructions) to the coprocessor 1245 on a coprocessor bus or other interconnects. The coprocessor 1245 accepts and executes the received coprocessor instructions.

Figure 9:
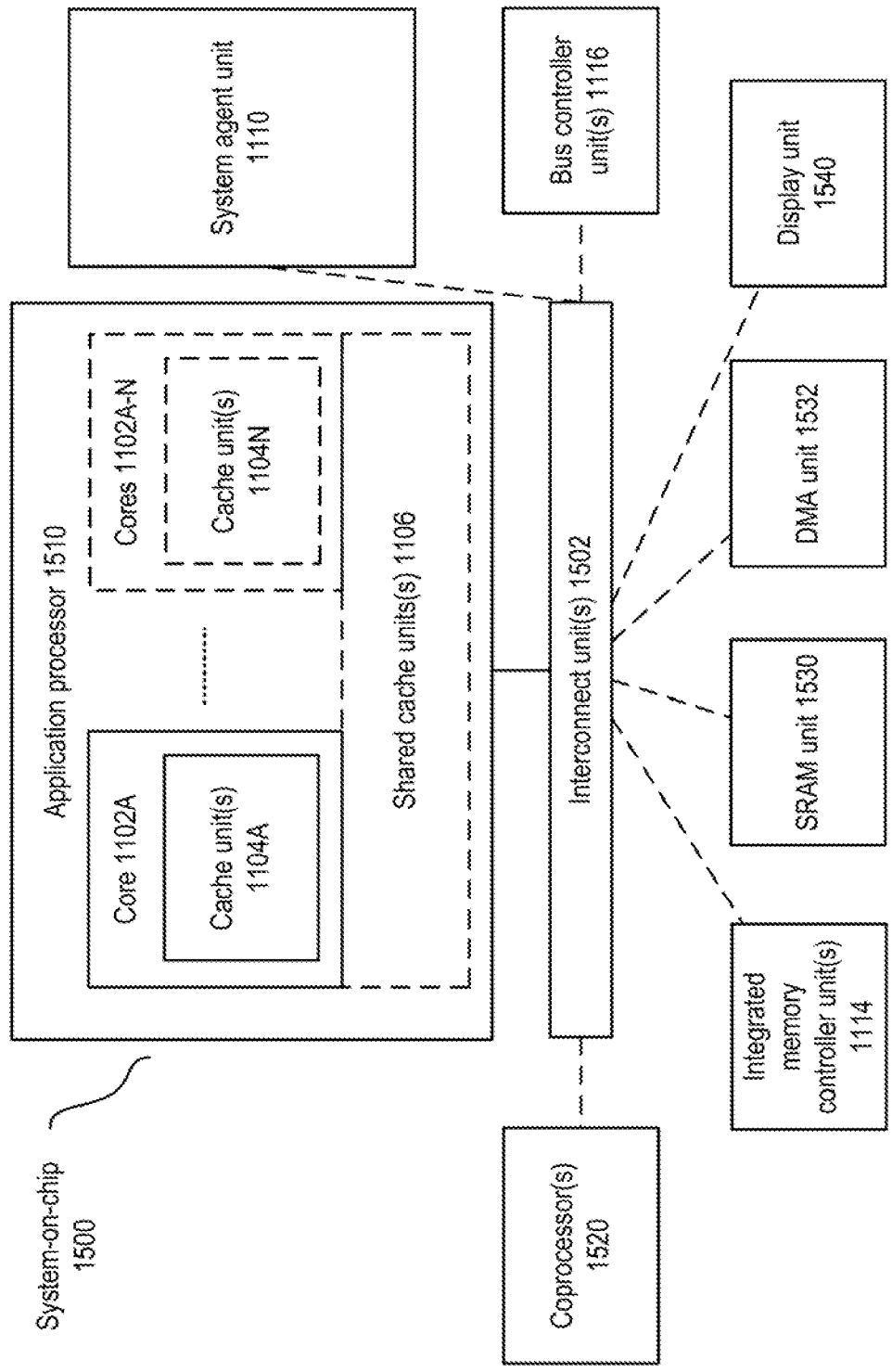
FIG. 9 is a schematic diagram of a system-on-chip (SoC) according to one embodiment of the present invention.

FIG. 9 is a schematic diagram of a system-on-chip (SoC) 1500 according to one embodiment of the present invention. The system-on-chip shown in FIG. 9 includes the processor 1100 shown in FIG. 7, and therefore, similar components to those in FIG. 7 have the same reference numerals. As shown in FIG. 9, an interconnect unit 1502 is coupled to an application processor 1510, a system agent unit 1110, a bus controller unit 1116, an integrated memory controller unit 1114, one or a plurality of coprocessors 1520, a static random access memory (SRAM) unit 1530, a direct memory access (DMA) unit 1532, and a display unit 1540 for coupling to one or a plurality of external displays. The application processor 1510 includes a set of one or a plurality of cores 1102A-N and a shared cache unit 110. The coprocessor 1520 includes integrated graphics logic, an image processor, an audio processor, and a video processor. In one embodiment, the coprocessor 1520 includes a special-purpose processor, such as, for example, a network or communication processor, a compression engine, a GPGPU, a high-throughput MIC processor, or an embedded processor.

Embodiments of the mechanisms disclosed herein may be implemented in hardware, software, firmware, or a combination of such implementation approaches. Embodiments of the present invention may be implemented as computer programs or program code executed on a programmable system. The programmable system includes at least one processor, a storage system (including volatile and non-volatile memories and/or storage elements), at least one input device, and at least one output device.

It should be understood that in order to simplify the present disclosure and help to understand one or more of various inventive aspects, various features of the present invention are sometimes grouped together into a single embodiment, figure, or description thereof in the above description of exemplary embodiments of the present invention. However, the method of the present disclosure should not be interpreted as reflecting such an intention that the present invention claimed requires more features than those explicitly recited in each claim. Rather, as the following claims reflect, inventive aspects lie in less than all features of a single embodiment disclosed above. Thus, the claims in accordance with the specific description of embodiments are hereby explicitly incorporated into the specific description, with each claim standing on its own as a separate embodiment of the present invention.

Those skilled in the art should understand that modules or units or components in the device in an example disclosed herein may be arranged in the device described in the embodiment, or may be alternatively located in one or a plurality of devices different from the device in the example. The modules in the foregoing examples may be combined into one module or may additionally be divided into a plurality of submodules.

Those skilled in the art can understand that modules in the device in an embodiment may be altered adaptively and arranged in one or a plurality of devices different from the embodiment. The modules or units or components in the embodiment may be combined into one module or unit or component, and may additionally be divided into a plurality of submodules or subunits or subcomponents. All of the features disclosed in this specification (including the accompanying claims, abstract, and drawings), and all of the processes or units of any method or device so disclosed, may be combined in any combination, except combinations where at least some of such features and/or processes or units are mutually exclusive. Each feature disclosed in this specification (including the accompanying claims, abstract, and drawings) may be replaced by an alternative feature serving the same, equivalent or similar purpose, unless expressly stated otherwise.

Furthermore, those skilled in the art can understand that, while some embodiments described herein include some but not other features of other embodiments, combinations of features of different embodiments are meant to be within the scope of the present invention and form different embodiments. For example, in the following claims, any one of the claimed embodiments can be used in any combination.

In addition, some of the embodiments are described herein as a method or combination of method elements that can be implemented by a processor of a computer system or by other apparatuses carrying out the function. Thus, a processor having the necessary instructions for implementing such a method or method element forms an apparatus for implementing the method or method element. Furthermore, an element described herein of an apparatus embodiment is an example of such an apparatus that is used for carrying out the function performed by the element for the purpose of carrying out the invention.

As used herein, unless otherwise specified, the use of the ordinal numbers "first", "second", "third", and so on to describe common objects merely indicates that different instances of like objects are being referred to, and are not intended to imply that the objects so described must be in a given sequence, either temporally, spatially, in ranking, or in any other manner.

Although the present invention has been described according to a limited number of embodiments, it would be appreciated by those skilled in the art benefiting from the foregoing description that other embodiments can be conceived within the scope of the present invention herein described. In addition, it should be noted that the language used in this specification has been chosen primarily for the purposes of readability and teaching, rather than for explaining or defining the subject matter of the present invention. Therefore, many modifications and variations would be apparent to those of ordinary skill in the art without departing from the scope and spirit of the appended claims. As for the scope of the present invention, the disclosure of the present invention is intended to be illustrative rather than limiting, and the scope of the present invention is defined by the appended claims.

The invention claimed is:

1. An instruction processing apparatus, comprising:
   a first vector register, adapted to store a first vector to be operated on;
   a second vector register, adapted to store a second vector to be operated on;
   a decoder, adapted to receive and decode a data splicing instruction, the data splicing instruction indicating:
      the first vector register as a first operand,
      the second vector register as a second operand,
      a splicing indicator including a first position indicator for indicating whether a first part of the first vector is acquired starting from a highest-order bit or a lowest-order bit, and a second position indicator for indicating whether a second part of the second vector is acquired starting from a highest-order bit or a lowest-order bit, and
      a destination; and
   an execution unit, coupled to the first vector register, the second vector register, and the decoder, and adapted to execute the decoded data splicing instruction, so as to acquire the first part of the first vector from the first vector register according to the first position indicator and acquire the second part of the second vector from the second vector register according to the second position indicator, splice the acquired first part of the first vector and the acquire the second part of the second vector to form a third vector, and store the third vector into the destination.

2. The instruction processing apparatus according to claim 1, wherein:
   the splicing indicator further includes a length indicator to indicate a length of the first part of the first vector; and
   the execution unit further adapted to execute the decoded data splicing instruction, so as to acquire the first part of the first vector from the first vector register according to the length indicator and the first position indicator.

3. The instruction processing apparatus according to claim 2, wherein the first, second, and third vectors have a same length, and a sum of the length of the first part of the first vector and a length of the second part of the second vector is equal to a length of the third vector.

4. The instruction processing apparatus according to claim 1, further comprising:
   a third vector register, adapted to serve as the destination to store the third vector.

5. An instruction processing apparatus, comprising:
   a first vector register, adapted to store a first vector to be operated on;
   a second vector register, adapted to store a second vector to be operated on;
   a general-purpose register, adapted to store a splicing indicator including a first position indicator for indicating whether a first part of the first vector is acquired starting from a highest-order bit or a lowest-order bit, and a second position indicator for indicating whether a second part of the second vector is acquired starting from a highest-order bit or a lowest-order bit:

a decoder, adapted to receive and decode a data splicing instruction, the data splicing instruction indicating:
the first vector register as a first operand,
the second vector register as a second operand,
the general-purpose register as a third operand, and a destination; and
an execution unit, coupled to the first vector register, the second vector register, the general-purpose register, and the decoder, and adapted to execute the decoded data splicing instruction, so as to acquire the first part of the first vector from the first vector register according to the first position indicator and acquire the second part of the second vector from the second vector register according to the second position indicator stored in the general-purpose register, splice the acquired first part of the first vector and the acquired second part of the second vector to form a third vector, and store the third vector into the destination.

6. The instruction processing apparatus according to claim 5, wherein:
the splicing indicator further includes a length indicator to indicate a length of the first part of the first vector; and
the second execution unit further adapted to execute the decoded data splicing instruction, so as to acquire the first part of the first vector from the first vector register according to the length indicator and the first position indicator.

7. The instruction processing apparatus according to claim 6, where the first, second, and third vectors have a same length, and a sum of the length of the first part of the first vector and a length of the second part of the second vector is equal to a length of the third vector.

8. The instruction processing apparatus according to claim 5, further comprising:
a third vector register, adapted to serve as the destination to store the third vector.

9. An instruction processing method, comprising:
receiving and decoding a data splicing instruction, the data splicing instruction indicating a first vector register storing therein a first vector as a first operand, a second vector register storing therein a second vector as a second operand, a splicing indicator including a first position indicator for indicating whether a first part of the first vector is acquired starting from a highest-order bit or a lowest-order bit, and a second position indicator for indicating whether a second part of the second vector is acquired starting from a highest-order bit or a lowest-order bit, and a destination; and
executing the decoded data splicing instruction, so as to acquire the first part of the first vector from the first vector register according to the first position indicator and acquire the second part of the second vector from the second vector register according to the second position indicator, splice the acquired first part of the first vector and the acquired second part of the second vector to form a third vector, and store the third vector into the destination.

10. The instruction processing method according to claim 9, wherein:
the splicing indicator further includes a length indicator to indicate a length of the first part of the first vector; and
the decoded data splicing instruction is further executed so as to acquire the first part of the first vector from the first vector register according to the length indicator and the first position indicator.

11. The instruction processing method according to claim 10, wherein the first, second, and third vectors have a same length, and a sum of the length of the first part of the first vector and a length of the second part of the second vector is equal to a length of the third vector.

12. The instruction processing method according to claim 9, wherein the step of storing the third vector into the destination comprises storing the third vector into a third vector register.

13. The instruction processing method according to claim 9, wherein:
the data splicing instruction indicates a general-purpose register storing therein the splicing indicator; and
the decoded data splicing instruction is further executes so as to acquiring the splicing indicator from the general-purpose register.

14. A computing system, comprising:
a memory; and
a processor, coupled to the memory and comprising:
a vector register set, comprising a first vector register adapted to store a first vector and a second vector register adapted to store a second vector;
a decoder, adapted to receive and decode a data splicing instruction from the memory, the data splicing instruction indicating the first vector register as a first operand, the second vector register as a second operand, a splicing indicator including a first position indicator for indicating whether a first part of the first vector is acquired starting from a highest-order bit or a lowest-order bit, and a second position indicator for indicating whether a second part of the second vector is acquired starting from a highest-order bit or a lowest-order bit, and a destination; and
an execution unit, coupled to the first vector register, the second vector register, and the decoder, and adapted to execute the decoded data splicing instruction, so as to acquire the first part of the first vector from the first vector register according to the first position indicator and acquire the second part of the second vector from the second vector register according to the second position indicator, splice the acquired first part of the first vector and the acquired second part of the second vector to form a third vector, and store the third vector into the destination.

15. The computing system according to claim 14, wherein;
the splicing indicator further includes a length indicator to indicate a length of the first part of the first vector and;
the execution unit further adapted to execute the decoded data splicing instruction, so as to acquire the first part of the first vector from the first vector register according to the length indicator and the first position indicator.

16. The computing system according to claim 15, wherein the first, second, and third vectors have a same length, and a sum of the length of the first part of the first vector and a length of the second part of the second vector is equal to a length of the third vector.

17. The computing system according to claim 14, wherein the vector register set further comprises a third vector register, adapted to serve as the destination to store the third vector.

18. The computing system according to claim 14, wherein the processor further comprises a general-purpose register adapted to store the splicing indicator,
the data splicing instruction indicates the general-purpose register storing therein the splicing indicator; and the execution unit is further coupled to the general-purpose register and adapted to acquire the splicing indicator from the general-purpose register for subsequent processing.

19. A non-transitory machine-readable storage medium, the machine-readable storage medium comprising code, wherein the code, when executed, causes a machine to perform the method according to claim 9.

20. A system-on-chip, comprising the instruction processing apparatus according to claim 1.

* * * * *